United States Patent
McWhorter

(10) Patent No.: US 6,831,825 B1
(45) Date of Patent: Dec. 14, 2004

(54) FUEL CELL IONIC CAPACITOR

(76) Inventor: Edward Milton McWhorter, 6931 Green Brook Cir., Citrus Heights, CA (US) 95621

( * ) Notice: Subject to any disclaimer, the term of this patent is extended or adjusted under 35 U.S.C. 154(b) by 43 days.

(21) Appl. No.: 10/457,702

(22) Filed: Jun. 10, 2003

(51) Int. Cl.[7] ................................................. H01G 4/06

(52) U.S. Cl. ...................... 361/321.6; 361/508; 361/516

(58) Field of Search .............................. 361/321.6, 508, 361/516, 528, 532, 318–319, 329

(56) References Cited

U.S. PATENT DOCUMENTS 6,628,505 B1 * 9/2003 Andelman .................. 361/541

* cited by examiner

Primary Examiner—Anthony Dinkins

(57) ABSTRACT

In a second generation fuel cell, hydrogen and oxygen are produced by the chemical dissociation of water with the simultaneous generation of electron charged hydroxyl ions. Alkali metals, termed initiators, and alkaline earths, termed moderators, react exothermally with water in the cathode compartment to generate charged hydroxyl ionic current flow in an amount corresponding to the electrochemical equivalence of the weight of each type material reacted. The ionic electron current flow resulting from the chemical reactions occurring in the cathode compartment is discharged on the outer surfaces of a metal conduit acting as a capacitor plate, and are electrically conducted through its metal wall and deposited on the inner surfaces of the metal conduit. The build up of electron charge on the inner wall reaches a critical potential and emits electrons to receptor hydroxyl ions of the passive receptor anodic electrolyte circuit flowing through the metal conduit. Because the metal conduit accepts electrons from the cathode electrolyte ions on its outer surface and emits electrons from its inner surface to ions in the anode electrolyte circuit it is termed an Ionic Capacitor. The Ionic Capacitor operates on the principle of conservation of energy and assumes the transference of electrons between its opposing plate surfaces as being electrochemically equivalent to the reversibility of the energy release of the chemical reactions occurring in the cathode circuit of the fuel cell.

2 Claims, 2 Drawing Sheets

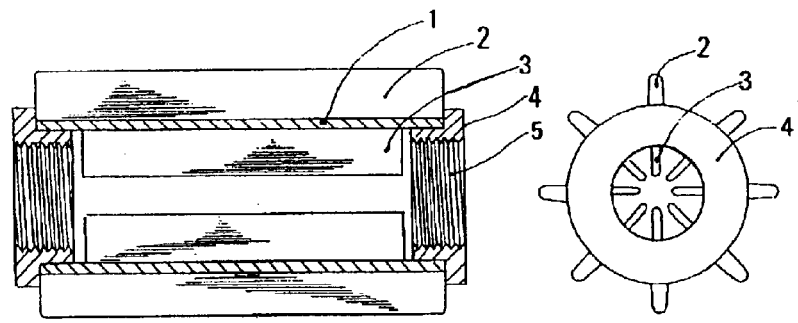
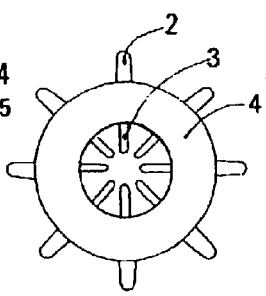
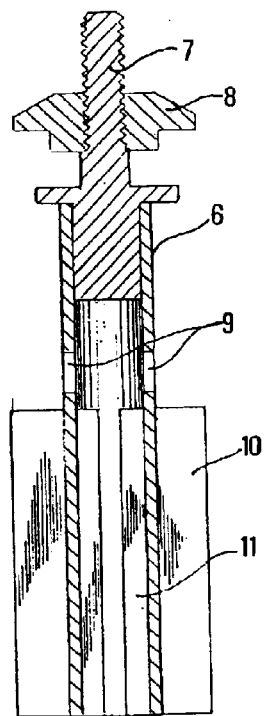
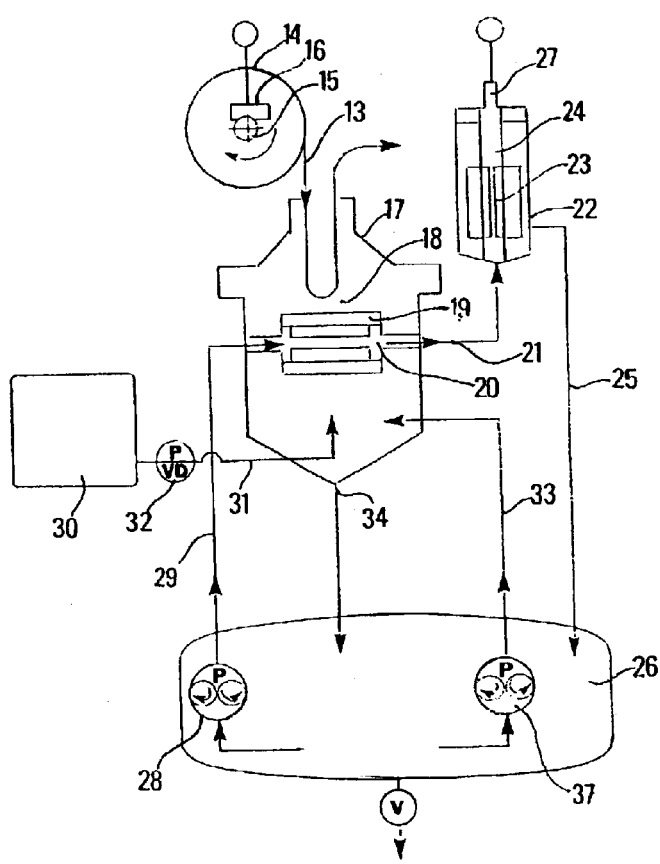
Fig.1    Fig.2
Fig.3
Fig.4

FUEL CELL IONIC CAPACITOR

CROSS REFERENCES

The present invention relates to my copending application Ser. No. 10/072,166 placed on file Feb. 11, 2002, and application entitled 'A Consumable Electrode', received Feb. 21, 2003 per postal record RA658677159US at USPTO Mail Center, awaiting a filing date.

BACKGROUND OF THE INVENTION

The invention is a metal conduit connector that joins two opposing sections of a non-metallic conduit that passes through an electrically insulated cathodic half-cell compartment of a hydrogen generator circuit described in Ref. 1 of the cross-references. The joined metal and non-metal conduits carry the flow of electrolyte to a corresponding half-cell compartment of an electrically insulated anode of the said hydrogen generator completing the internal polar ionic path between the cathode and anode separate electrolyte circuits.

The surfaces of the metal conduit connector serve as capacitor plates accepting electron charges of hydroxyl ions formed by the chemical action of active ingredients of a consumable electrode reacting with the water component of the cathode electrolyte. Ionic discharges to the outer surface of the metal conduit connector resulting from these chemical reactions are transferred by conduction through the metal wall to the surfaces of the inner wall of the metal conduit connector where they are discharged to anions flowing in the anode electrolyte circuit completing the internal potential circuit paths of electrical flow between the cathode and anode compartmented systems. Because of its ability to transfer the ionic charge of the cathode electrolyte through the metal conduit connector wall to anions in the anode electrolyte circuit the metal conduit connector is hereinafter termed an ionic capacitor.

Although the invention transfers electrons through its metallic cross-section from one contacting surface to another, and also operates within an electrolyte, it should not be confused with the ordinary electrolytic capacitor or electrolytic rectifier, both of which can only be used with a flow of electricity in one direction. The ionic capacitor presented in the Detailed Description of the Invention which follows does not employ a dielectric membrane, and it can be used for electrical current flowing both directions. Unlike the electrolytic capacitor or electrolytic rectifier, both of which employ metal wire leads for electrical conduction to and from their respective plate surfaces, the ionic capacitor uses the liquid ions of the electrolyte to convey the electron charge from its opposing conductive isolated surfaces between each electrolyte stream. Neither should the invention be considered as functioning as the Leyden jar consisting of a glass jar coated with a tinfoil within and without, each coating acting as individual plate surfaces such that a charge placed on one surface is discharged to the other surface when conductors to each plate are brought together.

Beyond its ability to transfer ionic charge from the cathode electrolyte fluid circuit to the anode electrolyte fluid circuit, the primary objective of the ionic capacitor is to provide a means of separating the gaseous hydrogen liberated within the cathode compartment from the gaseous oxygen liberated within the anode compartment of the hydrogen generator system of Ref. 1 of the cross-references. Separating the two gaseous systems in their respective compartments by use of an ionic capacitor circuit negates the possibility of explosive mixtures being formed that would create an operating hazard. In Ref. 1 of the cross-references, the method of separating the gaseous by products liberated at each respective electrode is only passively achieved by placing them in direct ionic circuit communication. In the present invention electron ionic transport and exchange from each electrode circuit occurs as an intermediate step of electrical conduction across the ionic capacitor wall which carries the charge into the anodic electrolyte stream.

The invention also facilitates the transfer of heat generated in the cathode compartment by the exothermic reaction of the chemically active agents of the consumable electrodes of Ref. 1 and Ref. 2 of the cross-references. In the electrical generating system of Ref. 1 the cathode compartment temperature is controlled by the consumable electrode feed-rate and by water dilution and also by variations of flow of recirculated electrolyte. These earlier methods of temperature control provide corrective macro-responses by acting directly upon the chemical reactions occurring in the cathode compartment and result in large electrodynamic changes in power output. The ionic capacitor acts as a heat exchanger by varying the rate of flow through it thus giving vernier control of gradual temperature changes within the cathode compartment.

Electron charge transfer through the ionic capacitor wall is more efficient at higher operating temperatures and higher electrolyte flow rates and the generated electrical power output more effectively utilized at steady-state electrolyte anion production fluid flow conditions made possible by the vernier temperature control capability of the ionic capacitor.

In the standard fuel cell, such as the Proton Exchange Membrane fuel cell, hydrogen atoms are cleaved to form protons and electrons, while on the other side of the cell the oxygen molecules are passed through a catalyst splitting them into two oxygen atoms. The protons and oxygen atoms combine to form water together with the net release of spare electrons generating an electric current. In the Second Generation Fuel Cell, which employs an Ionic Capacitor, a consumable electrode having an alkali metal initiator, in this instance sodium, is used to cleave the hydroxyl (OH) bonds of water to produce sodium hydroxide, protons, heat and spare electrons.

$$2Na + 2H_2O \rightarrow 2NaOH + 2H^+ + heat + 2 \text{ electrons}$$

The said spare electrons produced in the cathode compartment create an electrical potential across the Ionic Capacitor wall causing electronic conduction through the wall into the anodic electrolyte circuit stream of lower potential flowing through the Ionic Capacitor causing the hydroxyl ions in the said anodic electrolyte to become charged. The said charged hydroxyl ions are discharged at the anode to produce a water molecule, an oxygen atom, and 2 spare electrons.

$$OH^- + OH^- \rightarrow H_2O + 1/2 O_2 + 2 \text{ electrons}$$

The initiating energy necessary to sever the hydroxyl (OH) bonds of the water molecule is obtained from the chemically reactive alkali metal ingredients of the consumable cathodic electrode. The net release of spare electrons in the reaction is exactly equivalent to the current flow of the electrolytic deposition of the corresponding molecular equivalent weight of the active ingredients of the metals used in the said consumable electrode. If the initiating alkali metal is sodium the electron current flow is 528 amp hours per pound of sodium metal reacted.

SUMMARY OF THE INVENTION

The design objectives and unique features of the Ionic Capacitor become apparent when it is seen to operate within a vigorous chemically reacting electrolyte fluid in which exothermic heat is generated and hazardous gaseous by-products are formed and liberated at each respective electrode.

The primary objective of the Ionic Capacitor design is to provide an impermeable metal membrane separating direct contact of the electrolyte and gaseous by-products of the cathodic system from the electrolyte and gaseous by-products of the anodic system.

It is yet another object of the invention to provide a means of transferring the higher electrical potential of the chemically dynamic electrolyte system of the cathode compartment to the lower potential of the passive anode electrolyte stream by electrical conductance across the metal wall of the Ionic Capacitor.

It is yet another object of the invention to provide a means of compensating for minor fluctuations of temperature in the steady-state operation of chemical feed rates and reactions occurring in the cathode compartment through adjustments of the heat transfer rate across the 8 interfacing metal wall of the Ionic Capacitor by controlling the rate of flow of the cooler anodic electrolyte passing through the said ionic capacitor.

BRIEF DESCRIPTION OF THE DRAWINGS

Drawings are presented as part of the specification showing the elements of the Ionic Capacitor and the manner in which it is employed in the design of Second Generation Fuel Cells.

FIG. 1 is a cross section of the Cathode Ionic Capacitor.

FIG. 2 is an end view of the Cathode Ionic Capacitor shown in FIG. 1. Because the Ionic Capacitor is symmetrical about its axis FIG. 2 may be an inlet or an exit view.

FIG. 3 is a cross-section of the anode Ionic Capacitor.

FIG. 4 is a schematic of a Second Generation Fuel Cell showing the relative placement of the cathode and anode Ionic Capacitor in their corresponding Ionic Circuits.

DETAILED DESCRIPTION OF THE INVENTION

Figure 5:
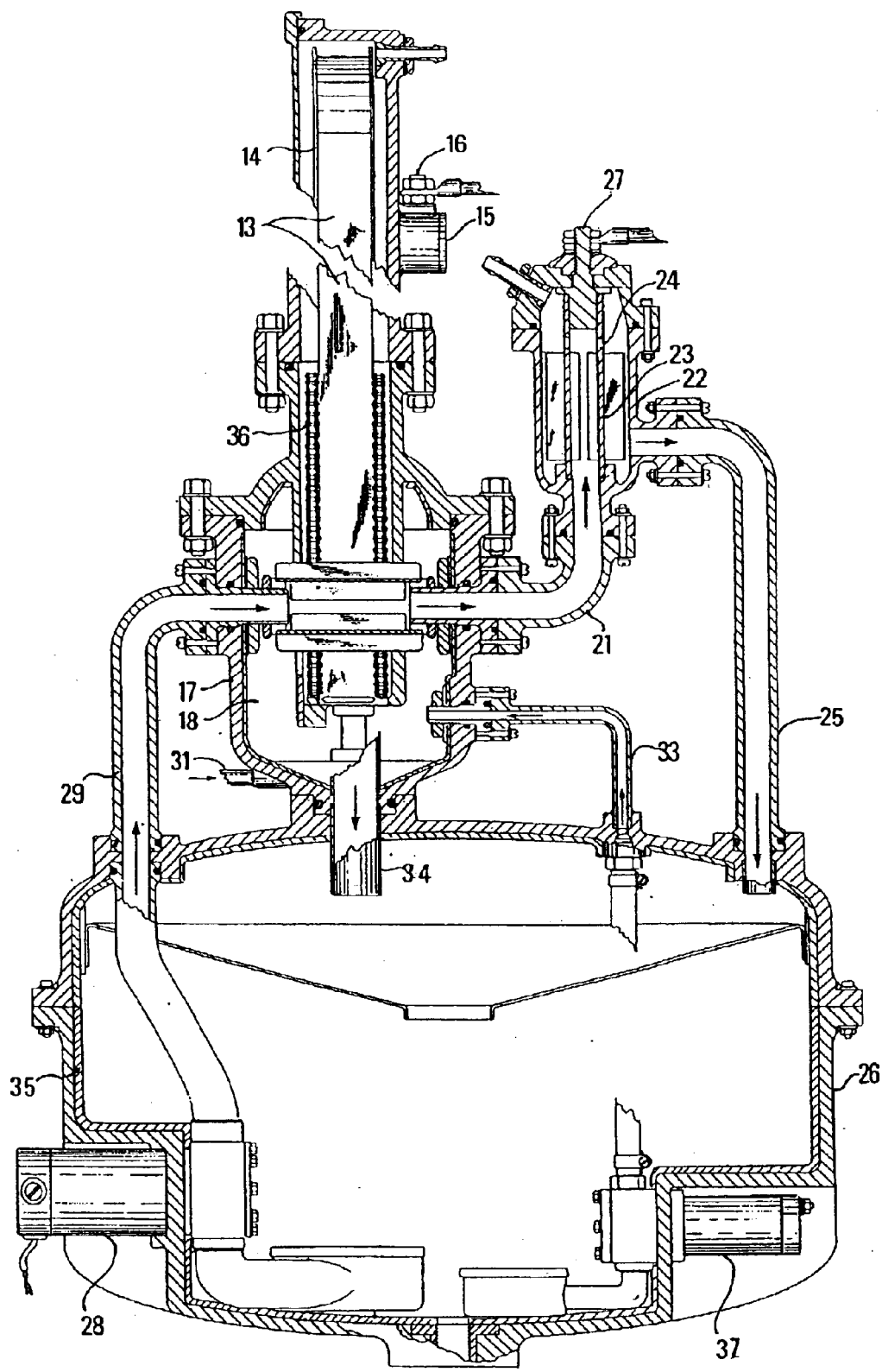
FIG. 5 is a working drawing of the Second Generation Fuel Cell shown principally in cross-section showing in greater detail the elements interacting with the Ionic Capacitors shown in FIG. 1 and FIG. 2.

The invention is an Ionic Capacitor that has two basic configurations. One configuration of the Ionic Capacitor design is adapted for use in the cathode compartment of a Second Generation Fuel Cell and the other for use in its anode compartment.

FIG. 1 is a cross-section of the cathode configuration of the Ionic Capacitor comprising a tubular section 1. Said tubular section 1 having a plurality of fins 2 running longitudinally along its outer surface and a plurality of fins 3 running along its inner surface. Said tubular section 1 having fixedly attached closures 4 at each end. Said closures incorporating in their design a threaded means of attachment 5 to the anode electrolyte piping circuit. It is readily seen that bolted flanging, welding, or other means of attachment does not effect the novelty of intended usage of the design. The closures 4 and threads 5 are hereinafter referred to in the specification and in the claims as attachment closures. The finned tubular section 1 may be constructed as a single casting or metal extrusion, or fabricated as a tubular section 1 having accordion folded thin wall metal structure wrapped around the outer surface of tubular section 1 to form outer fins 2 and also encircled within the tubular section 1 to form the inner fins 3 and the assembled pieces, including enclosures 4, furnace brazed in a single operation. This latter method of construction is cost effective and has the highest capacitance since the accordion folds generate greatest surface for ionic charge transfer. Outer fins 2 accept ionic charges from the higher potential of the chemical reacting electrolyte of the cathode compartment and electronically conduct these through tubular section 1 to inner fins 3 which in turn emit the charge to the lower potential passive anode electrolyte stream flowing in tubular section 1.

FIG. 2 is the end view of the cathode Ionic Capacitor showing edge views of the outer fins 2 and inner fins 3 and the outer surface of closure 4.

Turning now to FIG. 3 which is a cross-section of the anode electrode comprising the second configuration of the invention. In the first configuration of the invention shown in FIG. 1 cathode electrolyte is in contact with the surfaces of outer fins 3 and the anodic electrolyte flow is in contact with the inner fin 3 surfaces. In FIG. 3 only anodic flow is present on each surface.

In FIG. 3 tubular section 6 is fixedly attached to anode post 7 to which is attached bedding nut 8. A plurality of exit ports 9 are placed about the said tubular section at the same elevation. Said tubular section 6 having a plurality of fins 10 running longitudinally along its outer surface and a plurality of fins 1 running longitudinally along its inner surface. Anodic electrolyte flow from the cathode Ionic Capacitor flows through the inlet 12 of tubular section 6 and out through ports 9 and downward over outer fins 10 delivering its charged potential to anode post 7.

In FIG. 4, a consumable electrode tape 13, of Ref. 1 of the cross-references, is wound upon reel 14 which is rotatively mounted on armature axle 15. Armature axle 15 is in electrical contact with the aluminized surfaces of the said consumable electrode tape 13. Electrical brush 16 rides on armature axle 15. Consumable electrode 13 passes through cathode compartment 17 where its active ingredients chemically react with the cathode electrolyte 18 charging the hydroxyl ions of the said electrolyte 18 raising them to a higher electrical potential on the outside finned surfaces of the Ionic Capacitor 19 than the hydroxyl ions of the anodic electrolyte 20 flowing within the said Ionic Capacitor 19. The potential across the Ionic Capacitor 19 wall is dissipated by electron conduction across the wall charging the anodic electrolyte 20 flowing inside Ionic Capacitor 19 as previously described in the Background. The charged anodic electrolyte stream 20 passes out of Ionic Capacitor 19 through line 21 into the anode compartment 22 and entering upward through the anode Ionic Capacitor 23 passing through ports 24 and downward to exit the anode compartment 22 through line 25 to electrolyte reservoir 26. In passing through anode Ionic Capacitor 23 the anodic electrolyte stream 20 dispenses its electron charge to Ionic Capacitor finned surfaces and post 27. Anode electrolyte pump 28 pumps electrolyte from reservoir 26 through line 29 to the anodic inlet side of the cathode Ionic Capacitor 19 completing the anodic circuit flow of anode electrolyte 20 through the system.

Water from tank 30 is pumped by metering pump 32 to the cathode compartment 17 through line 31 maintaining the concentration level of alkalinity in the electrolyte flowing circuits and reservoir.

Electrolyte is recirculated from the electrolyte reservoir 26 to the cathode compartment 17 by pump 37 through cathode recirculation line 33. Cathode electrolyte 18 returns to electrolyte reservoir 26 through cathode standpipe return line 34.

FIG. 5 is a working drawing of the Second Generation Fuel Cell having the same numbered elements and component positioning as that shown in the schematic layout of FIG. 4. The structural components of the system shown in FIG. 5 are constructed of light-weight reinforced plastic material lined with rubber bladders 35 and internal rubber coatings to electrically insulate and decrease static electron leakage to the outside surfaces thereby increasing the electrical potential between armature axle 15, brush 16 and anode post 27, the electrical connecting points of the external load circuit. Because of the local high temperature generated at the consumable electrode tape 13 surface resulting from the exothermic chemical reaction of the alkali metal initiator in the said tape 13 a metal link conveyor 36 is used to carry the said tape 13 into the cathode compartment 17. The metal link conveyor 36 provides the necessary support and tensile strength to the consumable electrode tape 13 to assure sufficient structural integrity to pass through the cathode compartment 17.

| Numbered Elements of the Drawings |
| --- |
| 1. tubular section |
| 2. outer fins |
| 3. inner fins |
| 4. closure |
| 5. threaded means |
| 6. tubular section |
| 7. anode post |
| 8. bedding nut |
| 9. port |
| 10. outer fins |
| 11. inner fins |
| 12. inlet |
| 13. consumable electrode tape |
| 14. reel |
| 15. axle |
| 16. brush |
| 17. cathode compartment |
| 18. cathode electrolyte |
| 19. cathode ionic capacitor |

| -continued |
| --- |
| Numbered Elements of the Drawings |
| 20. anode electrolyte |
| 21. line |
| 22. anode compartment |
| 23. anode ionic capacitor |
| 24. port |
| 25. line |
| 26. reservoir |
| 27. post |
| 28. pump |
| 29. line |
| 30. water tank |
| 31. water line |
| 32. water pump |
| 33. line |
| 34. standpipe |
| 35. bladder |
| 36. conveyor |
| 37. pump |

What is claimed is:

1. A cathode Ionic Capacitor comprising a tubular section, said tubular section having a plurality of fins extending longitudinally along its outer surface and radiating outward, and a plurality of fins extending longitudinally along its inner surface and radiating inward, said tubular section being closed at each end by fixedly attached attachment closures for connection with an electrolyte fluid circuit.

2. An anode Ionic Capacitor comprising a tubular section, said tubular section having a plurality of fins extending longitudinally along its outer surface and radiating outward, and a plurality of fins extending longitudinally along its inner surface and radiating inward, said tubular section closed at one end by an anode post to which is attached a bedding nut, said tubular section having exit ports below the said anode post, said tubular section having an open end for connection with an electrolyte fluid circuit.

* * * * *